(12) United States Patent
Bibb

(10) Patent No.: US 8,455,029 B2
(45) Date of Patent: Jun. 4, 2013

(54) METHOD FOR REDUCING CANCER STIMULATING COMPOUNDS IN COW'S MILK

(76) Inventor: Robert Bibb, Myrtle Beach, SC (US)

(*) Notice: Subject to any disclaimer, the term of this patent is extended or adjusted under 35 U.S.C. 154(b) by 618 days.

(21) Appl. No.: 12/462,973

(22) Filed: Aug. 11, 2009

(65) Prior Publication Data
US 2009/0304881 A1 Dec. 10, 2009

Related U.S. Application Data

(63) Continuation-in-part of application No. 11/104,372, filed on Apr. 13, 2005, now abandoned.

(51) Int. Cl.
*A23C 3/07* (2006.01)
*A23C 3/076* (2006.01)

(52) U.S. Cl.
USPC .......................................... 426/248; 426/522

(58) Field of Classification Search
USPC .................. 426/248, 236–237, 247, 521, 522
See application file for complete search history.

(56) References Cited

U.S. PATENT DOCUMENTS

| 1,680,818 A | 8/1928 | Steenbock et al. |
|---|---|---|
| 1,817,936 A | 8/1931 | Supplee |
| 2,001,555 A | 5/1935 | Trebler |
| 2,072,416 A | 3/1937 | Berndt et al. |
| 2,072,417 A * | 3/1937 | Berndt et al. ............ 204/157.67 |
| 2,606,122 A | 8/1952 | Stark |
| 3,934,042 A | 1/1976 | De Stoutz |
| 5,578,336 A | 11/1996 | Monte |
| 2006/0045796 A1 * | 3/2006 | Anderle et al. .................... 422/3 |

OTHER PUBLICATIONS http://iuva.org/uv-faqs; pp. 1-5; date N/A.*
Alison Stewart; "Hormones in Milk Are Linked to Cancer"; http://www.consumerhealthjournal.com/articles/milk-and-cancer.html; Mar. 2004.
H.F. Kraybill et al.; "Effect of Ionizing Radiation on the Allergenicity of Milk Protein"; http://jds.fass.org/cgi/reprint/42/4/581.pdf; 1959.
Grosvenor et al.; "Hormones and Growth Factors in Milk"; Endocrine Reviews, 1993, pp. 710-728.
Shaneyfelt et al.; "Hormonal Predictors of Prostate Cancer: A Meta-Analysis"; Journal of Clinical Oncology; vol. 18, No. 4 Feb. 2000; pp. 847-853.
Hankinson et al.; "Circulating concentrations of insulin-like growth factor I and risk of breast cancer"; The Lancet; vol. 351, Issue 9113; May 1998; pp. 1393-1396.
Collier et al.; Factors Affecting Insulin-Like Growth Factor-1 Concentration in Bovine Milk; Journal of Dairy Science; 1991; vol. 74 (9); pp. 2905-2911.

* cited by examiner

*Primary Examiner* — Steven Leff
(74) *Attorney, Agent, or Firm* — Abelman, Frayne & Schwab

(57) ABSTRACT

A decrease in the biological activity of the proteins and hormones present in milk, which have been implicated in certain cancers, is accomplished by exposing the hormones and proteins to ultraviolet irradiation of at least 5,000 joules/m$^2$.

1 Claim, 1 Drawing Sheet

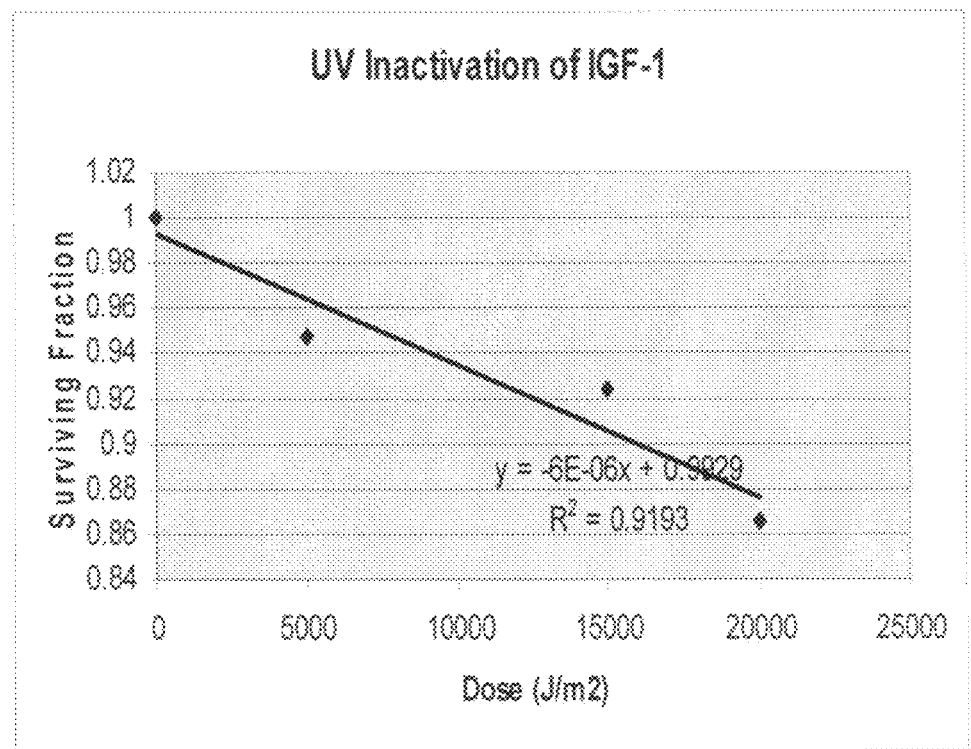

METHOD FOR REDUCING CANCER STIMULATING COMPOUNDS IN COW'S MILK

CROSS REFERENCE TO RELATED APPLICATIONS

This application is a Continuation-in-Part of U.S. application Ser. No. 11/104,372, filed Apr. 13, 2005 now abandoned.

FIELD OF THE INVENTION

The present invention relates generally to electromagnetic spectra irradiation and ionizing irradiation of cow's milk and includes but is not limited to ultraviolet light, infrared light, ultrasound, ionizing radiation and other physical processes that destroy the chemical bonds of any and all cancer stimulating substances in cow's milk, and more specifically, it relates to a process for reducing cancer stimulating compounds in cow's milk. These same naturally occurring compounds in cow's milk are suspected to have negative health effects in humans.

BACKGROUND OF THE INVENTION

It can be appreciated that ultraviolet light irradiation of cow's milk was the method of choice to create vitamin D beginning in the mid nineteen twenties until the early nineteen fifties. This process was abandoned then because it became possible to create vitamin D synthetically. Epidemiological research suggests a correlation between the elimination of ultraviolet light irradiation of cow's milk and appears to coincide with an increase in the incidence of certain types of human cancers, namely, breast and prostate cancers.

A comparative study published in 1989 showed that in Europe, two areas with higher milk consumption—Scandinavia and The Netherlands—also had higher breast cancer rates.

In their 1993 article in *Endocrine Reviews*, Grosvenor et al. "Hormones and Growth Factors in Milk" listed insulin-like growth factor-1 as one of the agents present in cow's milk. This has served to link IGF-1 levels to an increased risk of prostate cancer.

In a February 2000 article by Shaneyfelt et al. entitled, "Hormonal Predictors of Prostrate Cancer: A Meta-Analysis" which appeared in the *Journal of Clinical Oncology*, it was stated that, " . . . epidemiologic studies unequivocally link serum insulin-like growth factor-1 (IGF-1) levels with risk for prostate cancer."

A similar correlation was found among pre-menopausal women with breast cancer by Hankinson et al. in a 1998 article in Lancet entitled, "Circulating Concentrations of Insulin-Like Growth Factor-1 and The Risk of Breast Cancer".

Insulin-like growth factor-1 (IGF-1) is a protein with hormone-like properties. It is folded upon itself and is held in this configuration by three (3) sulfur-sulfur links (disulfide bonds). IGF-1 is derived from its structural configuration, which is similar to that of insulin.

IGF-1 is mainly produced in the liver, but also exists naturally in human breast milk. IGF-1 levels vary widely in the blood stream and are influenced by exercise, diet and age. It is a potent stimulator of cell proliferation and it is at its highest levels during the teen years. With advancing age, the levels of IGF-1 drop off.

It has been found that IGF-1, which is secreted in human milk and is identical to that secreted in cow's milk, consists of exactly the same 70 amino acid sequence. This protein hormone is very heat stable and is not destroyed during pasteurization. (Collier et al. Factors Affecting Insulin-Like Growth Factor-1 Concentration in Bovine Milk, *Journal of Dairy Science* 1981, Vol. 74 (9):2905-11.)

IGF-1 is carried in the blood stream attached to one (1) of six (6) different binding proteins. These binding proteins are labeled one (1) through six (6) with insulin-like growth factor binding to protein three (3) being the most common. It has been found that 85% of IGF-1 in the blood stream is bound to binding protein-3. Binding protein-3 is also found in human milk and its fragments in seminal fluid.

Although ultraviolet light irradiation of cow's milk is known, its use in the prior art was solely to generate vitamin D in situ, whereas in the subject invention it is sought to use ultraviolet radiation to reduce the sterol ring structure of certain androgenic and estrogenic compounds, such as estrogen sulfate, which is a water-soluble estrogen found in milk, as well as rendering biologically inactive the structure of other biological compounds which are capable of stimulating cancer growth, and includes, but is not limited to, compounds such as insulin-like growth factor one, epidermal growth factor, transforming growth factor beta and prostate specific antigen.

SUMMARY OF THE INVENTION

The process of the present invention comprises irradiating with an ultraviolet light source, or other electromagnetic device, or an ionizing irradiation device having adequate radiation intensity, dwell time and surface exposure to break the sterol bonds of the cyclic compounds comprising the androgenic and estrogenic sterol compounds and to destroy the chemical structure of other cancer stimulating compounds present in cow's milk or products derived from cow's milk such as cheese, ice cream, butter and yogurt.

It is accordingly an object of the present invention to inactivate proteins and hormones which are present in milk and which have been implicated in the causation of certain cancers.

The above and other features of the present disclosure will become apparent from the following description and the attached FIG. 1.

BRIEF DESCRIPTION OF THE DRAWINGS

FIG. 1 is a graph representing the UV irradiation of IGF-1 in accordance with the present invention.

DETAILED DESCRIPTION OF THE INVENTION

The present invention is a process for decreasing the biological activity of compounds found in cow's milk which are suspected of stimulating certain human cancers. The process consists of irradiating cow's milk with ultraviolet light during its processing and prior to ingestion by humans.

It has been found that when insulin-like growth factor-1 (IGF-1), epidermal growth factor, transforming growth factor beta and prostate-specific antigen, all of which are found in cow's milk and products prepared therefrom, are exposed to doses of ultraviolet radiation at an intensity of at least about 5,000 joules/meter$^2$ to about 20,000 joules/meter$^2$, or preferably even higher dosages, their biological activity is decreased and such decrease in activity proceeds in a dosage-dependent fashion.

the change in the amount of stimulation of the cells resulting from damage to the IGF by UV.

Cells were plated in medium, medium plus unirradiated IGF or medium plus IGF exposed to different doses of 254 nm radiation. They were then cultured for 48 hours at 37° C. in an atmosphere of 5% $CO_2$. MTS was added and they were cultured for an additional 4 hours. Absorbance of the supernatant liquid was then measured. The absorbance of the samples treated with unirradiated IGF was divided by the absorbance found for the untreated cells. This gives a value greater than 1.0. because cell growth has been stimulated by the IGF.

TABLE 1

| Dose (J/m$^2$) | Jun. 23, 2009 | Jun. 25, 2009 | Jul. 10, 2009 | Jul. 15, 2009$_{(1)}$ | Jul. 15, 2009$_{(2)}$ | Mean | SD | Ln (SF) |
|---|---|---|---|---|---|---|---|---|
| | | | | Surviving Fractions | | | | |
| | | | | LoVo Summary | | | | |
| 5,000 | 0.91 | 0.88 | 0.989 | 0.971 | 0.991 | 0.9482 | 0.050316 | −0.05319 |
| 15,000 | 0.924 | 0.824 | 0.936 | 0.976 | 0.959 | 0.9238 | 0.059314 | −0.07926 |
| 20,000 | 0.896 | 0.811 | 0.879 | 0.894 | 0.851 | 0.8662 | 0.035717 | −0.14364 |

| Dose (J/m$^2$) | | | | Jul. 13, 2009$_{(1)}$ | | | | |
|---|---|---|---|---|---|---|---|---|
| | | | | Δ % Stimulation | | | | |
| 5,000 | 10.29 | 12.86 | 1.12 | 3.34 | 1.04 | 5.73 | 5.490692 | |
| 15,000 | 8.68 | 19.55 | 8.25 | 2.82 | 4.54 | 8.768 | 6.515026 | |
| 20,000 | 11.7 | 20.9 | 15.16 | 12.93 | 16.15 | 15.368 | 3.558647 | |

It is reasonable to assume that irradiation of IGF-1 with ultraviolet radiation causes inactivation of IGF-1 because the secondary structure of the molecule, which is stabilized by three (3) disulfide bonds, is known to be sensitive to irradiation by ultraviolet light.

Example

Cells of the LoVo colon cancer line were used to assess the biological activity of IGF-1. The cells were cultured in medium supplemented with 10% fetal calf serum for 24 hours and then medium without serum for 24 hours. Irradiated or unirradiated IGF-1 was added and culturing was continued for another 48 hours. IGF-1 was purchased from R&D Systems, Minneapolis, Minn. Metabolic activity of the cells was determined using the MTS assay in which the mitochondria convert the colorless compound to a blue formazan dye. The intensity of the color is measured in a densitometer as the amount of absorbance at a wavelength of 540 nm. The control cells were suspended in culture medium alone without IGF.

Treatment with IGF stimulates cell growth and results in the production of more formazan and greater absorbance. The amount of stimulation is expressed as the ratio of the absorbance of cells treated with IGF to the absorbance of the untreated cells. If irradiation of the IGF results in denaturation (or loss of biological activity), then the absorbance of the medium around the cells treated with the irradiated IGF will be less than that of the medium around the cells treated with unirradiated IGF. The absorbance of medium from the cells treated with the unirradiated protein minus the absorbance of the medium from cells treated with irradiated IGF is When the data for the surviving fraction of IGF-1 are plotted against dosage, as depicted in FIG. 1, it has been found to conform to the formula $y=-6E-06x+0.9929$, wherein y is the surviving fraction, x is the dosage in joules/m$^2$ and E is $10^{-6}$ and to have a high correlation coefficient for $R^2$, namely, 0.9193. The high value of $R^2$ indicates that the equation has high predictive value which demonstrates a high degree of linearity between the application of UV radiation and the reduction in the activity of IGF-1 in stimulating cancer cells.

The terms and expressions which have been employed are used as terms of description and not of limitation, and there is no intention in the use of such terms and expressions of excluding any equivalents of the features shown and described or any portions thereof, but it is recognized that various modifications are possible within the scope of the invention as claimed.

What is claimed is:

1. A method of decreasing the biological activity of IGF-1 in cows milk and products made therefrom prior to their introduction in mammalian diets, which consists of exposing the milk containing IGF-1 to a source of ultraviolet radiation to achieve a UV radiation dosage between 5000 joules/meter$^2$ and 20000 joules/meter$^2$ of the milk containing IGF-1, wherein the biological inactivation of IGF-1 conforms to the formula $y=6E-06x+0.9929$, where y is the surviving fraction, x is the UV dosage (J/m$^2$) and E is $10^{-6}$.

* * * * *